C. S. McCLURE.
HAY BUNCHING MACHINE.
APPLICATION FILED OCT. 16, 1916.

1,227,058.

Patented May 22, 1917.
2 SHEETS—SHEET 1.

Inventor
C. S. McClure

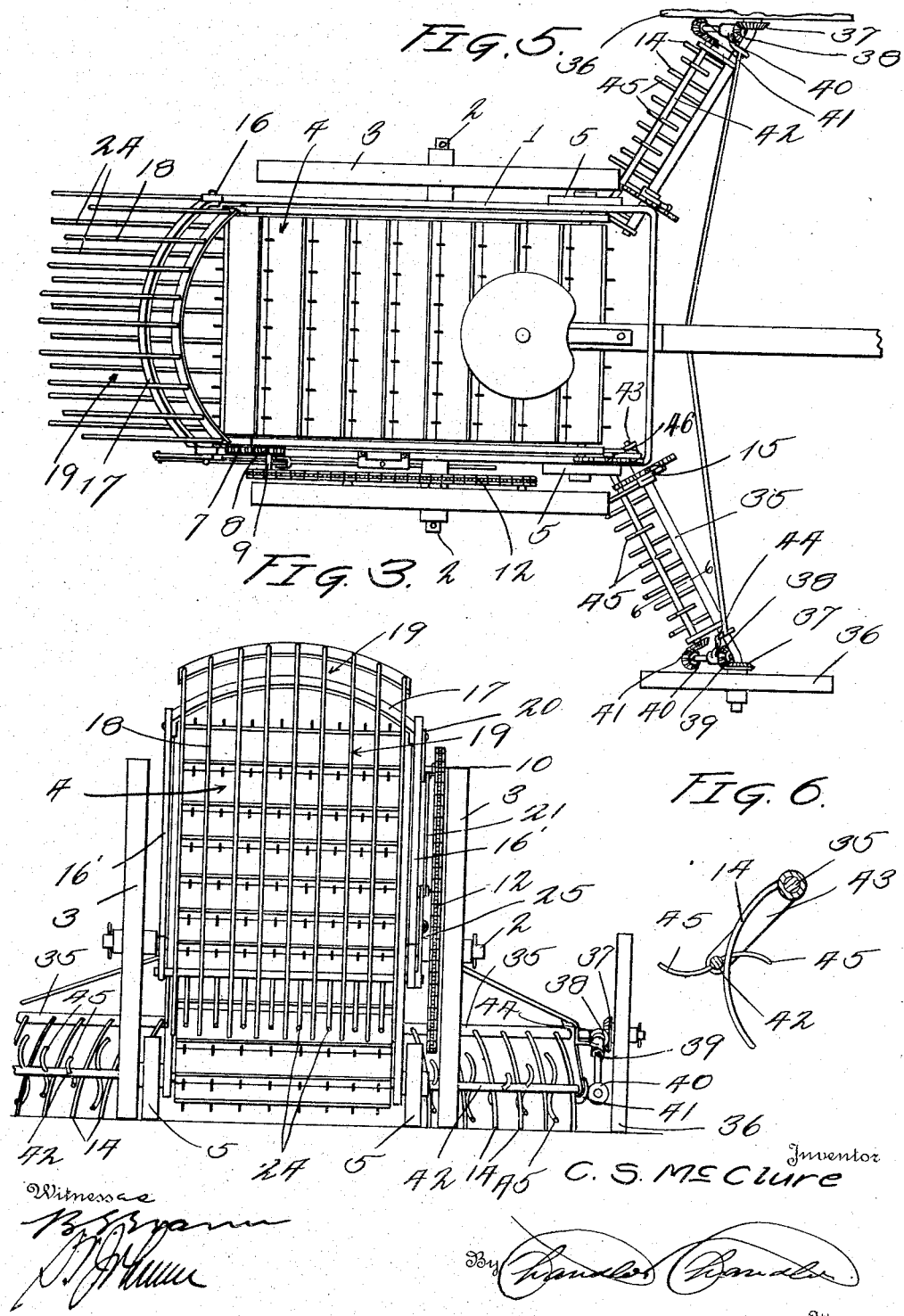

UNITED STATES PATENT OFFICE.

CAREY S. McCLURE, OF DAYTON, WYOMING.

HAY-BUNCHING MACHINE.

1,227,058.   Specification of Letters Patent.   Patented May 22, 1917.

Application filed October 16, 1916. Serial No. 125,949.

*To all whom it may concern:*

Be it known that I, CAREY S. MCCLURE, a citizen of the United States, residing at Dayton, in the county of Sheridan, State of Wyoming, have invented certain new and useful Improvements in Hay-Bunching Machines; and I do hereby declare the following to be a full, clear, and exact description of the invention, such as will enable others skilled in the art to which it appertains to make and use the same.

The present invention is directed to improvements in machines for bunching hay, and has for its object to so construct a device of this character that the cut hay will be properly bunched after which the same is deposited in small stacks.

A further object of the invention is to provide a machine of this character so constructed that the cut hay will be gathered and elevated to the bunching device during the movement of the machine.

A still further object of the invention is to provide a machine of this character so constructed that the cut hay will be guided to the elevator which supports the cut hay to the bunching device.

Still another object is to provide a revolving rake for directing the hay toward the center of the machine.

With these and other objects in view, this invention resides in the novel features of construction, formation, combination and arrangement of parts to be hereinafter more fully described, claimed and illustrated in the accompanying drawing, in which:—

Fig. 3 is a rear elevation of Fig. 1.

Fig. 5 is a top plan view.

Fig. 6 is a sectional view on line 6—6 of Fig. 3.

Figure 1:
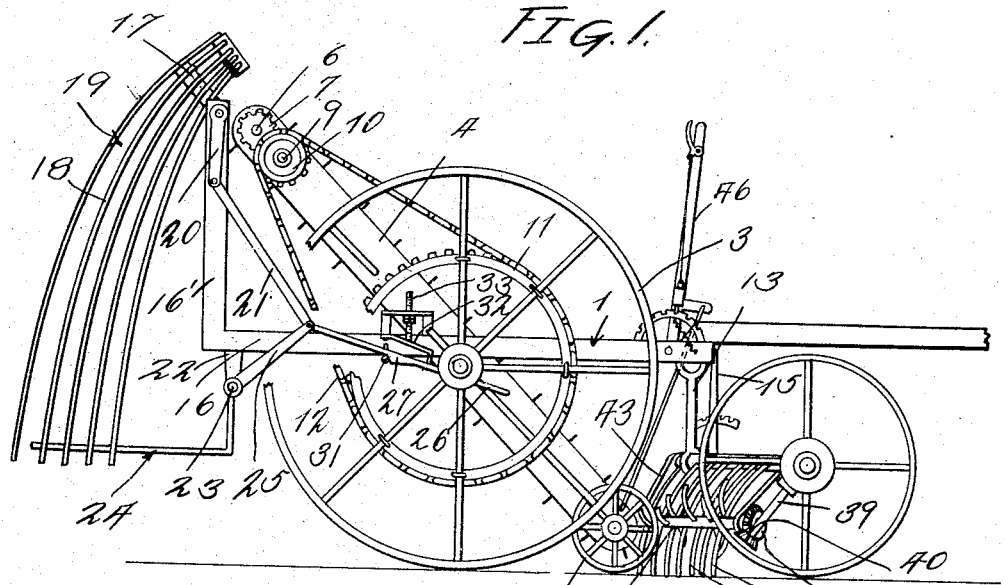
Figure 1 is a side elevation of the device showing the same in its operative position.

Referring to the drawings 1 indicates the frame, which is supported by the axle 2, said axle being provided with ground wheels 3. Pivotally supported by the frame 1 is an endless elevator 4, the lower end of which is provided with wheels 5 which are adapted to engage the ground so as to hold the elevator in proper position for picking up the hay. The upper end of the elevator is provided with a driving shaft 6, which has fixed to one end a gear 7, said gear being in mesh with the gear 8, which is supported by a stub shaft 9 and on which is also fixed a sprocket wheel 10. Fixed to one of the wheels 3 is a sprocket wheel 11 which is engaged by the sprocket chain 12 that is also passed around the sprocket wheel 10. Thus it will be seen that when the machine is in motion that movement will be imparted to the endless elevator.

Supported by brackets 13, which are supported by the forward end of the frame 1 are rake teeth 14, which may be raised or lowered through the medium of the lever 15, which is also supported by the forward end of the frame. The rake teeth 14 serve to direct the hay to the lower end of the elevator 4, so that as the machine moves forwardly the hay will be carried upwardly by the elevator.

The rear ends of the bars 16 and the frame 1 terminate in vertical arms 16′ which support the ends of the band 17, which is engaged with the rods 18 of the cage 19. To one of the ends of the band 17 is fixed an arm 20 which has pivotally connected to its lower end a link 21, the purpose of which will appear later.

Brackets 22 are supported by the rear ends of the bars 16 and have journaled therein the ends of the rock shaft 23, said shaft having connected thereto a grid or slatted bottom 24 which forms in conjunction with the cage 19 a bunching chamber for receiving the hay as it falls from the upper end of the elevator 4. To one end of the shaft 23 is fixed an arm 25 which is pivotally connected with the link 21, and the rear end of the rod 26, said rod having a plate 27 formed thereon and provided with beveled edges 28 and 29.

Fixed to one of the bars 16 adjacent the rod 26 is a bracket 30 which supports the roller 31, said rod being held in yielding engagement with the roller by the spring arm 32. The forward end of the arm 32 slidably engages the bar 26. The tension of the arm 32 can be regulated by adjusting the screw 33 carried by the bracket 34 which is mounted on the adjacent bar 16, said arm being also supported by the bracket.

Figures 2, 4:
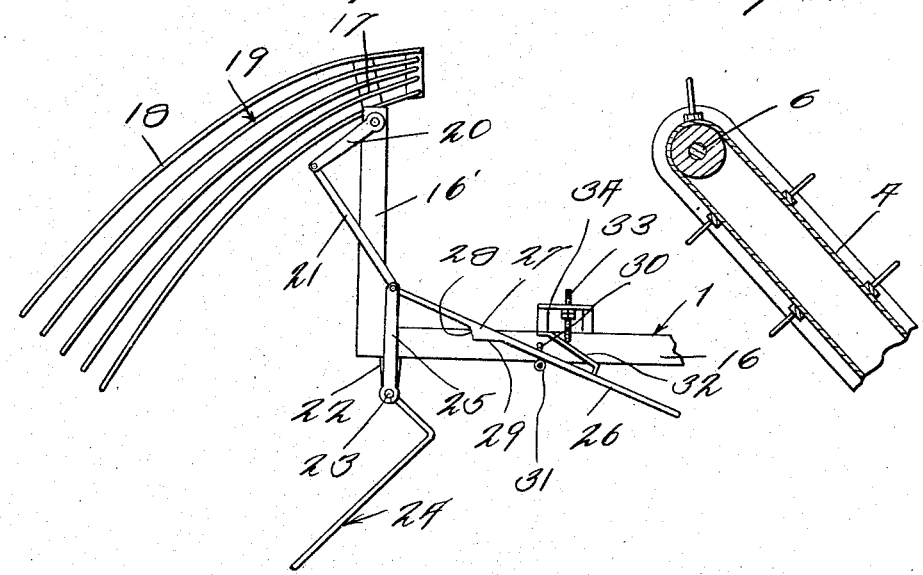
Fig. 2 is a fragmentary side elevation, showing the same in its dumping position.
Fig. 4 is a fragmentary longitudinal sectional view through the elevator.

When the beveled edge 28 of the plate 27 is engaged with the roller 31 the cages 19 and 24 will be held in a position as shown in Fig. 1, but when the weight of the hay on the cage 24 is sufficient to overcome the tension of the arm 32 it is obvious that the plate 27 will move rearwardly with the bar 26, thus swinging the cage 19 upwardly while the cage 24 swings downwardly, whereupon the parts assume the position as shown in Fig. 2, thus dumping the hay. As soon as the hay is dumped the weight of the cage 19 will serve to move the bar 26 forward, whereby the beveled edge 29 of the plate 27 will ride over the roller 31, thus resetting the parts.

The bars 35 of the rake teeth 14 have their outer ends rotatably engaged by the wheels 36, the hubs of which are provided with gears 37 which mesh with the gears 38 carried by the upper ends of the shafts 39, said shafts having beveled gears 40 carried by their outer ends which mesh with the beveled gears 41 carried by the outer ends of the shafts 42, said shafts having their inner ends journaled in the brackets 43. The outer ends of the shafts 42 are engaged in the hangers 44. Kicker teeth 45 are engaged with the shafts 42, said teeth being positively curved and are arranged spirally with respect to the shafts, whereby when the shafts are rotated the hay engaged by the teeth 14 will be fed toward the center of the machine.

Mounted on the frame 1 is an end lever 46 which has connected thereto a link 47, the lower end of which is connected to the lower end of the endless elevator 4, said lever being of a conventional form and serves to raise or lower the elevator as desired.

What is claimed is:—

1. In a device of the class described, the combination of a main frame, an elevator associated therewith, bunching rods having their upper ends pivotally connected to said frame and extending in a downward and rearward direction, a grid also pivotally connected to said frame and associated with said bunching rods for forming a chamber in which hay is collected, connections between said bunching rods and said grid operated by the weight of the hay to swing said elements on their pivots to dump the hay from said chamber, a rod attached to said connections and means engaging said rod and exerting a pressure thereon to prevent operation of said connections until the weight of the hay in said chamber is sufficient to overcome said pressure.

2. In a device of the class described, the combination of a main frame, an elevator associated therewith, bunching rods having their upper ends pivotally connected to said frame and extending in a downward and rearward direction, a grid also pivotally connected to said frame and associated with said bunching rods for forming a chamber in which hay is collected, connections between said bunching rods and said grid operated by the weight of the hay to swing said elements on their pivots to dump the hay from said chamber, a rod attached to said connections, a beveled member carried by said rod, an element carried by the frame and engaging said beveled member to retard the movement of said rod in one direction, and means engaging said rod and exerting a pressure thereon to retain said beveled member in engagement with said element until the weight of the hay in said chamber is sufficient to overcome said pressure.

3. In a device of the class described, the combination of a main frame, an elevator associated therewith, bunching rods having their upper ends pivotally connected to said frame and extending in a downward and rearward direction, a grid also pivotally connected to said frame and associated with said bunching rods for forming a chamber in which hay is collected, connections between said bunching rods and said grid operated by the weight of the hay to swing said elements on their pivots to dump the hay from said chamber, a rod attached to said connections, means engaging said rod and exerting a pressure thereon to prevent operation of said connections until the weight of the hay in said chamber is sufficient to overcome said pressure, and means carried by said frame and engaging the first named means for regulating the pressure exerted thereby on said rod.

4. A device of the class described comprising a wheeled supporting frame, an endless elevator supported by the frame, bunching rods pivotally connected with the frame, a rock shaft supported by the frame, a grid supported by the rock shaft and coöperating with said bunching rods, a bracket supported by the frame, a spring arm carried by the bracket, means for regulating the tension of the arm, a rod, links each having one of their ends pivotally connected to the rod, the other ends of said links being connected with the rock shaft and bunching rods respectively, a plate carried by the rod and having beveled edges, a roller supported by the frame for engaging one of the beveled edges to hold the cages in their operative position, said edge riding over the roller when a predetermined amount of hay has been deposited on the lower cage, the weight of the upper cage serving to move the rod forwardly to cause the rear beveled edge to again engage the roller to hold the cages in their operative positions.

In testimony whereof, I affix my signature, in the presence of two witnesses.

CAREY S. McCLURE.

Witnesses:
 DOROTHY E. JONES,
 WALTER V. JONES.

Copies of this patent may be obtained for five cents each, by addressing the "Commissioner of Patents, Washington, D. C."